United States Patent
Wouters et al.

[11] Patent Number: 5,810,039
[45] Date of Patent: Sep. 22, 1998

[54] MODULE FOR EXTRACTING FLUID FROM A HOLLOW VESSEL

[75] Inventors: Paul Wouters, Vilvoorde; Georges Hore; Marc Obsomer, both of Brussels, all of Belgium

[73] Assignee: Solvay (Société Anonyme), Brussels, Belgium

[21] Appl. No.: 514,470

[22] Filed: Aug. 11, 1995

[51] Int. Cl.[6] .................................................. F16L 55/18
[52] U.S. Cl. ............................ 137/15; 137/565; 137/590; 137/592
[58] Field of Search .................................... 137/565, 590, 137/592, 15, 315

[56] References Cited

U.S. PATENT DOCUMENTS 4,869,225  9/1989  Nagata et al. ........................ 137/592
5,058,557  10/1991  Frank et al. ........................... 137/565
5,080,077  1/1992  Sawert et al. ......................... 137/590

FOREIGN PATENT DOCUMENTS

WO80/00326  3/1980  WIPO .

*Primary Examiner*—A. Michael Chambers
*Attorney, Agent, or Firm*—Spencer & Frank

[57] ABSTRACT

A module to be arranged within a hollow vessel for extracting fluid from the hollow vessel is provided, the module comprising a pumping device, at least one filtering device and at least one extension arm which has means enabling connection with the outside of the module.

Also provided are a process for fixing such a module inside of a hollow vessel, a hollow vessel comprising such a module and a method for extracting fluid from a hollow vessel wherein the fluid is extracted by such a module.

6 Claims, 1 Drawing Sheet

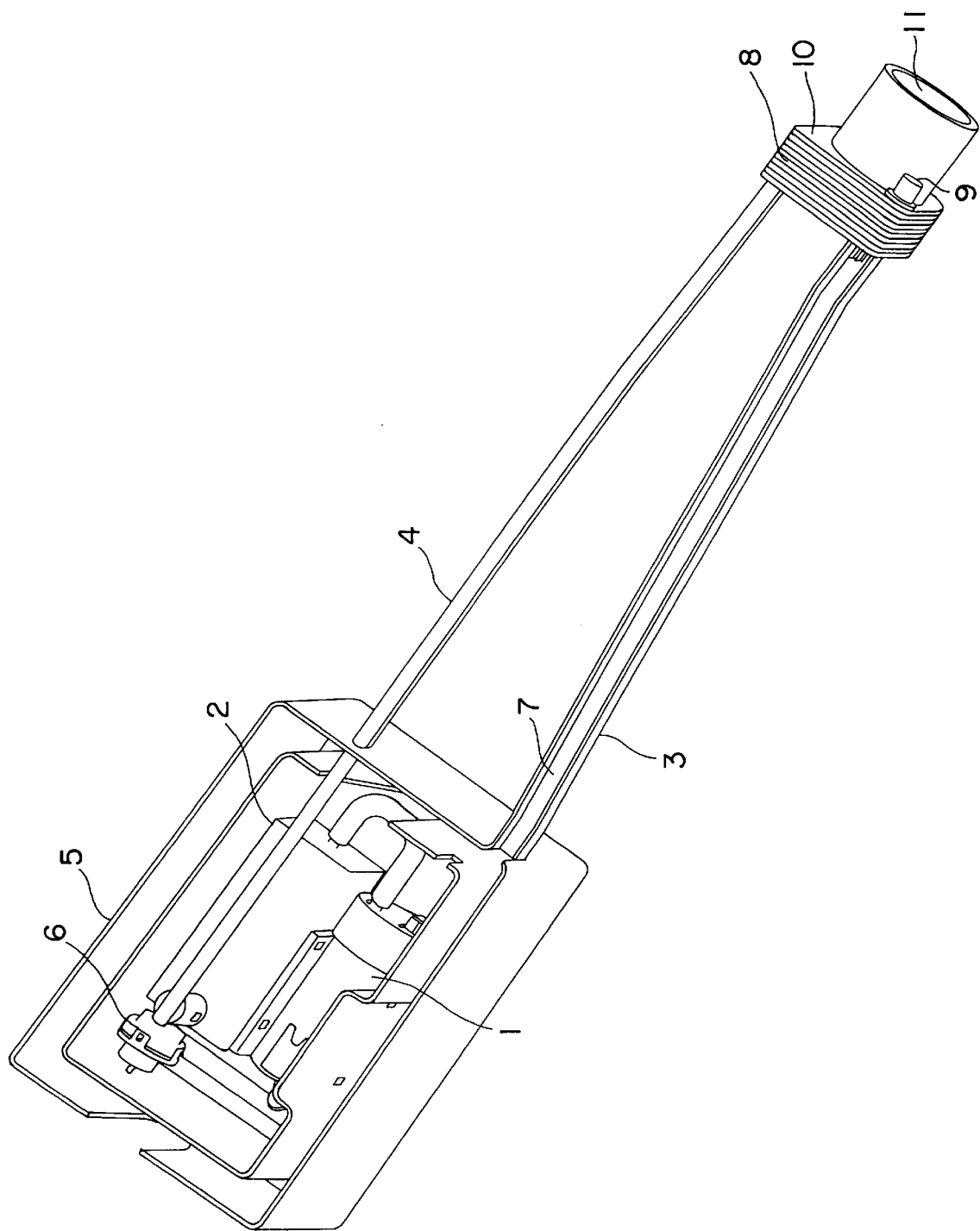

MODULE FOR EXTRACTING FLUID FROM A HOLLOW VESSEL

FIELD OF THE INVENTION

The present invention concerns a module for extracting fluid from a hollow vessel.

TECHNOLOGY REVIEW

Hollow vessels, for example tanks and bottles, are most often used to contain fluids to which they are substantially impermeable. These days thermoplastics are largely used to manufacture such hollow vessels due to their light weight, corrosion resistance, safety and ability to be easily formed into complex shapes.

It is usual to extract fluid from such a vessel for use elsewhere or to at least partially empty the vessel to allow its refilling by the same or a different fluid. There is therefore a routine need for a pumping device and associated means to transport fluid from the vessel to its destination. These pumping device and associated means are often located apart from each other and installed in remote places.

It is known to insert some means associated with the pumping device inside of the hollow vessel, in particular during its manufacturing. For example, it is known from WO 80/00326 (SOCIETE DE TRANSFORMATION DES MATIERES PLASTIQUES) to fix a fuel tap inside of a thermoplastic fuel tank by positioning the fuel trap inside of an extruded parison before and during blow molding of the fuel tank, the support of the fuel trap being fixed onto one of the continuous walls of the fuel tank.

However, such a method still requires separate handling and further assembling of some other means associated with the pumping device. Should some of these means have to be inserted in the hollow vessel after its manufacturing, it would also be required to leave in the hollow vessel after its manufacturing at least one supplementary hole of a size enabling insertion of said means in at least one supplementary step and enabling connections to the means. All the means being assembled in the hollow vessel, it will finally be necessary to tightly close the insertion holes in the hollow vessel with a material compatible with the other materials and with their possible differential expansion due to changes of the conditions in which the hollow vessel will be used.

It clearly appears therefrom that such a complete pumping system remains difficult to conceive, to handle and to install. Moreover, its functioning still leaves leaks risks.

SUMMARY OF THE INVENTION

The object of the invention is, therefore, to define means as complete as possible which incorporate several functions for extracting fluid from a hollow vessel and which can be easily manufactured, handled and installed, and safety used.

The invention concerns a module to be arranged within a hollow vessel for extracting fluid from the hollow vessel, the module comprising a pumping device, at least one filtering device and at least one extension arm which has means enabling connection with the outside of the module.

BRIEF DESCRIPTION OF THE DRAWING

The figure shows a module to be arranged within a thermoplastic fuel tank for extracting fuel from the fuel tank. The module includes an extracting pump (1), a fine filter (2) downstream of the pump, and two extension arms (3) and (4). The module also includes a fuel trap and support (5), and a pressure regulating device (6) downstream of the pump (1) and the filter (2). The two extension arms are joined and ended at one extremity by an attachment (8). The attachment comprises three orifices, one (9) for entry of an electrical cable, a second (10) for exit of the extracted fuel, and the third (11) for the blowing of the thermoplastic fuel tank during its blow molding and for filling the tank with fuel when in use.

DETAILED DESCRIPTION OF THE INVENTION

The module comprises a support together with at least the pumping device and the at least one filtering device. It could have been pre-assembled or produced as one integral unit. By support is meant any means of attaching together at least the pumping device and the at least one filtering device such that they constitute a single entity and can be handled as such and installed in one step. The module is substantially rigid and remains only sufficiently flexible to allow its insertion and positioning in the hollow vessel.

The purpose of the pumping device is for extracting fluid from the hollow vessel.

The pumping device can be of any sort known to a practitioner in the art for the transportation of fluids. It can be selected and adapted to its specific function and in particular to the fluid to be extracted.

At least one filtering device is present in the module. It can be of any sort know to a practitioner in the art for the removal of particles from a fluid passing through it. In particular, it can be conceived as a coarse or as a fine filtering device. Several filtering devices, in particular two, can be present in the module and used in combination.

The pump device is connected in the module in series with the at least one filtering device, by any appropriate means, such that the fluid passing through the pumping device has passed or will pass through the at least one filtering device. In particular, at least one filtering device is upstream of the pumping device especially to protect it. A finer filtering device can be further present in the module downstream of the pumping device.

The fluid can be a liquid or a gas. In particular, it is a liquid. More particularly, it is a fuel.

The extension arm, by itself, is substantially rigid and remains only sufficiently flexible to allow its insertion and positioning in the hollow vessel.

Means of the extension arm enabling connection of the module with the outside can be of any type, such as among others a groove. In particular means are fully integrated inside of the extension arm, in order to define an internal passage through the complete length of the extension arm.

The extension arm has means enabling connection of the module with the outside of the module. After fixing of the module with the hollow vessel, they enable especially the connection of the module with the outside of the hollow vessel.

The connection of the module, by the extension arm, with the outside can be for any reason. Especially, it is for energy supply to the module or for fluid transfer.

In particular, at least one extension arm has means enabling electrical connection of part of the module to an electrical supply outside of the module. More particularly, one extension arm has means enabling electrical connection of part of the module to an electrical supply outside of the module. Such as electrical supply through the extension arm avoids the need for any supplementary means to do so, any further assembly of it and any further hole in the hollow vessel for the electrical supply. It enables for example the electrical supply of the pumping device.

Interesting results are also obtained when at last one extension arm has means enabling fluid extraction from the module to the outside of it. More specifically, one such extension arm with means enabling fluid extraction from the module to the outside of it offers very good results. Such an extraction of the fluid through the extension arm avoids the need for any supplementary means to do so, any further assembly of it and any further hole in the hollow vessel for the fluid extraction.

Preferably, at least one extension arm is ended at one extremity by an attachment to be inserted in the wall of the hollow vessel. The extremity ended by this attachment is the extremity opposed to the extremity where are placed the pumping device and the at least one filtering device. Most preferably there is only one such attachment. When there are several extension arms, they are in particular joined and ended by a single attachment.

It is interesting that the attachment comprises at least one orifice. Such an orifice can correspond to the prolongation of the means enabling connection with the outside of the module through an extension arm. Said orifice can also be independent of the means enabling connection with the outside of the module through an extension arm.

Further to the above-mentioned elements, the module advantageously comprises one or several additional elements. In particular, it also comprises at least part of a fluid trap to be placed in the hollow vessel to ensure pumping of the fluid in most of the possible use conditions of the hollow vessel. Preferably, it comprises a complete fluid trap. It can also comprise at least part of a fluid gauge which will indicate the fluid level in the hollow vessel after fixing of the module in it. It is also interesting that the module further comprises a pressure regulating device. This pressure regulating device is directed to regulate the pressure in the fluid line and is placed downstream of the pumping device. It is possible integration in the module advantageously simplifies the later assembly of the complete fluid line. The module can also comprise at least one valve associated with the hollow vessel.

As above described, the invention concerns a very interesting module for extracting fluid from a hollow vessel.

It is also directed to a process for fixing within a hollow vessel a module for extracting fluid comprising a pumping device, at least one filtering device and at least one extension arm which has means enabling connection with the outside of the hollow vessel, the fixing taking place during the manufacturing of the hollow vessel.

Essential and alternative features of the module to be fixed and of its elements are as above described.

The hollow vessel can be of any material. In particular, it is essentially made of thermoplastic material. By thermoplastic material is understood one or several thermoplastic polymers. The polymers can be homopolymers, copolymers or a suitable mixture of them. Typical examples could be polyolefins or polyvinyl chlorides. Good results have been obtained by using polyethylene. Excellent results have been obtained by using high density polyethylene (HDPE). The thermoplastic material can equally comprise one or several additives such an antioxydants, stabilisers, pigments etc.

The hollow vessel can be manufactured from one thermoplastic material only or equally from several layers of different thermoplastic materials.

The hollow vessel can be of any type, especially a flask or a tank. Typically, it could be a tank, in particular directed to be used in a vehicle. Specifically, the hollow vessel is a fuel tank.

The hollow vessel can be manufactured by any process. When essentially made of thermoplastic material, it can especially be manufactured by welding of at least two parts previously obtained by injection. When essentially made of thermoplastic material, it can alternatively be obtained by injection- or extrusion-blow molding. Interesting results have been obtained when the manufacturing of the hollow vessel, essentially consisting of thermoplastic material, is by a process of extrusion-blow molding. In such an extrusion-blow molding process, a parison is extruded in an open mold, the module to be fixed is positioned in the parison, the mold is closed and the hollow vessel is blown.

Fixing of the module within the hollow vessel during manufacturing of the hollow vessel can be made by any known process, among others by hot pressing of the module on at least part of a wall or on a specific place of the hollow vessel. Fixing can also be completed in a further step, for example by supplementary hot pressing, ultrasonic welding or their combination.

The fixing of the module can in particular comprise fixing of at least part of its support or of the at least part of the fluid trap that it possibly comprises.

In the manufacturing process of the hollow vessel, when this process comprises joining of at least two parts (e.g. welding of pre-injected parts, closing of two parts mold), the fixing of the module advantageously comprises the fixing of one end of the at least one extension arm by its positioning in the contacting surfaces of the parts.

During the manufacturing of the hollow vessel, the extension arm can be used at last as part of the support for the module, in particular as the complete support for the module in the hollow vessel.

As above-mentioned, at least one extension arm of the module is advantageously ended at one extremity by an attachment to be inserted in the wall of the hollow vessel.

In the process for fixing the module within the hollow vessel, it is then also advantageous that at least one extension arm of the module is ended at one extremity by an attachment, the attachment being inserted in the wall of the hollow vessel during its manufacturing in order to form part of the outside surface of said hollow vessel.

By this way, the extension arm of the module can in particular constitute the complete support of the module inside of the hollow vessel during manufacturing of this hollow vessel, so avoiding any problem of inserting and removing a support during manufacturing of the hollow vessel.

It is also more advantageous here that the attachment comprises at least one orifice.

More particularly, when the hollow vessel, essentially consisting of thermoplastic material, is manufactured by a blow molding process, one said orifice of the attachment of at least one extension arm is used during manufacturing of the hollow vessel for blowing the hollow vessel. In this case, it is evident that all other possible orifices must be obturated during the blowing of the hollow vessel or must be so small that they do not affect the blowing step.

The attachment inserted in the surface of the hollow vessel forms part of the outside surface. Preferably, it completes the outside surface.

The invention is also directed to a hollow vessel comprising within the hollow vessel a module for extracting fluid, the module comprising a pumping device, at least one filtering device and at least one extension arm which has means enabling connection with the outside of the hollow vessel.

Essential and alternative features of the hollow vessel, of the module and of its elements are as above described.

As also above described, the hollow vessel is advantageously a fuel tank.

The invention finally concerns in a method of extracting fluid from a hollow vessel, the improvement wherein the fluid is extracted by a module arranged within the hollow vessel comprising a pumping device, at least one filtering device and at least one extension arm which has an internal conduit enabling connection with the outside of the hollow vessel.

Reference is once again made for the essential and alternative features of the hollow vessel, of the module and of its elements to the above description.

In particular, in the method, at least one extension arm of the module is ended at one extremity by an attachment comprising at least one orifice and said orifice enables filling of the hollow vessel with the fluid.

By this way, it can be seen that the module, further to the above-mentioned advantages, enables by the same orifice in the attachment the possible blowing of the hollow vessel during manufacturing and filling of the hollow vessel with the fluid when in use.

The following figure illustrates in a non-limitative way the invention.

The figure shows a module to be arranged within a thermoplastic fuel tank for extracting fuel from said fuel tank, the module comprising an extracting pump (1), a fine filter (2) downstream the pump and two extension arms (3)(4). As illustrated, the module also comprises a fuel trap and support (5) and a pressure regulating device (6) downstream the pump (1) and the filter (2). A non illustrated coarse filter may also be installed in the module upstream the pump and underneath it.

The extension arm (3), has a groove (7) for placing an electrical cable enabling electrical connection of the pump (1) to an electrical supply outside of the module and outside the fuel tank in which the module will be in use. The extension arm (4) has an internal conduit enabling extraction of the fuel from the module and from the tank to a feeding line of an engine.

The two extension arms are joined and ended at one extremity by an attachment (8) to be inserted in the wall of the thermoplastic fuel tank during its blow molding. During the blow molding of the fuel tank, the module is fully supported inside of the fuel tank by the two extension arms, so avoiding any problem arising from its support by an additional mean. After insertion, the attachment will complete the outside surface of the fuel tank. The attachment comprises three orifices, one (9) for the entry of the electrical cable, the second (10) for the exit of the extracted fuel and the third (11) for the blowing of the thermoplastic fuel tank during its blow molding and for filling the tank with fuel when in use.

What is claimed is:

1. A process for fixing within a hollow vessel a module for extracting fluid comprising a pumping device means within said module, at least one filtering device means within said module in communication with said pumping device means and at least one substantially rigid extension arm supporting said module which has means enabling connection outside of the hollow vessel, said process comprising positioning said module before manufacture of the hollow vessel, and fixing said module during the manufacturing of the hollow vessel.

2. The process according to claim 1, wherein the hollow vessel is a fuel tank.

3. The process according to claim 1, wherein the manufacturing of the hollow vessel, essentially consisting of thermoplastic material, is by a process of extrusion-blow molding.

4. The process according to claim 1, wherein at least one extension arm of the module is ended at one extremity by an attachment, the attachment being inserted in the wall of the hollow vessel during its manufacturing in order to form part of the outside surface of said hollow vessel.

5. The process according to claim 3, wherein the attachment comprises at least one orifice.

6. The process according to claim 5, wherein the manufacturing of the hollow vessel, essentially consisting of thermoplastic material, is by a process of extrusion-blow molding and wherein one orifice of the attachment of at least one extension arm is used during manufacturing of the hollow vessel for blowing the hollow vessel.

* * * * *